United States Patent [19]
Banner

[11] 3,802,112
[45] Apr. 9, 1974

[54] FISHING ROD HOLDER MEANS
[76] Inventor: Philip M. Banner, 28 Oxford Rd., Massapequa, N.Y. 11758
[22] Filed: Dec. 7, 1971
[21] Appl. No.: 205,673

[52] U.S. Cl............ 43/21.2, 43/25.2, 248/42
[51] Int. Cl............................... A01k 97/10
[58] Field of Search .......... 43/21.2, 25.2; 248/42

[56] References Cited
UNITED STATES PATENTS
1,662,983  3/1928  Pflueger .................... 43/25.2
1,985,985  1/1935  Gerline ................. 43/21.2 UX
2,506,824  5/1950  Brown et al. ................. 248/42
2,673,416  3/1954  Brock ....................... 43/25.2
2,958,491  11/1960  Ackley ...................... 248/42

*Primary Examiner*—Louis G. Mancene
*Assistant Examiner*—Daniel J. Leach

[57] ABSTRACT

A fishing rod holding means pivotally connected to a base part having means of securing same to different surfaces. The angle of the holding means is adjusted to a desired position and held by locking means. A fishing pole locking means is provided seperately within the holder means, said holder means also having a fishing hook holding means.

6 Claims, 9 Drawing Figures

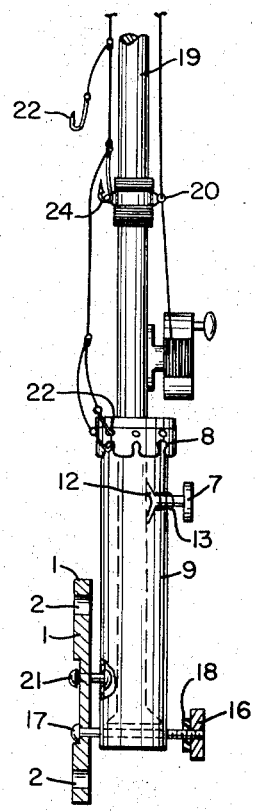
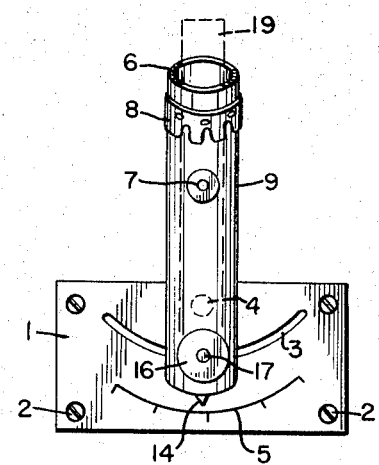
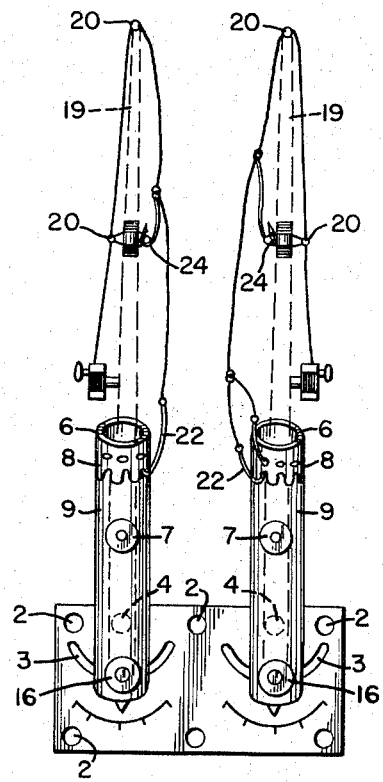
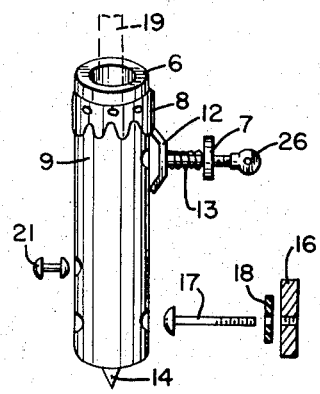
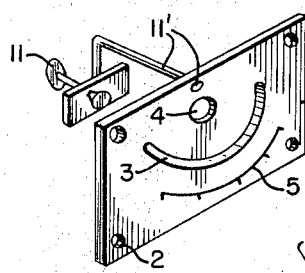
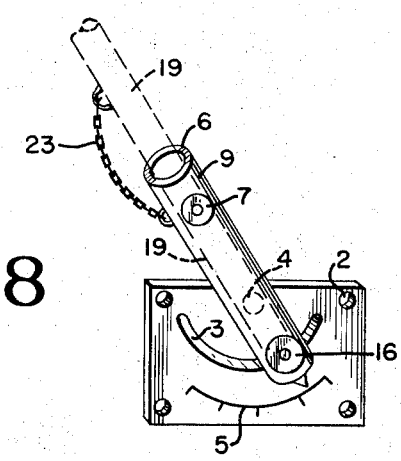
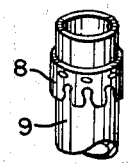
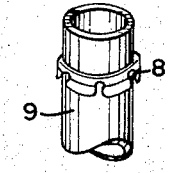
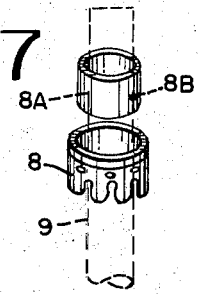

FISHING ROD HOLDER MEANS

Rod holders are commonly used on boats for securing fishing poles, the prior art showing non-pivoting types having a cylindrical shape and secured in a permanent position. They are usually installed either at an angle or straight up in an immovable position. While this may be desirable in some instances, the prior art does not provide the distinct flexibility advantage of a rod holder being able to be positioned to allow for the proper angle of the fishing pole while in transit and at sea.

The present invention provides maximum utility when installed at the stern or on the sides of a boat whereby the fishing pole can be adjusted to a number of positions conducive to the needs of the fisherman. When installed upon the stern the position can be directed outwardly the same as outriggers leaving more room for other fishermen without crowding small areas. This would also be effective for using fishing poles instead of outriggers in some instances for trolling, a common method of fishing. Another important improvement in this invention is the method of locking the fishing pole by locking means and for securing fish hooks of various sizes when the pole is not in use. The present invention can be installed on a boat, or a dock affording improvement to all fishermen offering utility and safety. Further, the use of a multiple unit combining more than one fishing rod holder on a base would be extremely advantageous. When installed upon the stern of a boat it gives a variety of fishing pole positions on both sides of the boat as an outrigger plus center positions at the same time, if desired. In the outboard position it acts as a double outrigger that provides utility and novelty for small boats where the owners cannot spend large sums of money for expensive equipment. It holds fishing rods in place by an internal lock in the holder and an adjustable attachable chain. The internal lock could be locked with a key, if desired to prevent theft of the fishing pole.

Accordingly, a principal object of the invention is to provide a new and improved fishing pole holder means for marine craft or for fishermen.

Another object of the invention is to provide a new and improved adjustable rod holding means comprising a minimum of parts.

Another object of the invention is to provide a means of locking a fishing pole in the holder, of simple design built into the tube rod holder away from water hazards in the form of a self retractable bolt spring and U shaped clamp in addition to a attachable snap lock chain to secure a pole while game fishing.

Another object of the invention is to provide a means of locking fishing hooks to the same pole holder tube that locks the fishing rod which will not cause it to become loose by both moving at the same time. The various locks illustrated receive a fish hook burying the dangerous point in such a way that if the line were slack it would still remain locked. Means are provided for more than one form of entry into a lock having a neoprene or rubber insert jacket that holds pressure against the hooks placed in the openings. Fishing hooks are a serious cause of major accidents on boats and generally by fishermen everywhere. In a rolling sea it is difficult to control the fishing pole or the action due to the wind where a simple lock would be very helpful. Without a good lock the line gets loose and the hook is found swinging in all directions. Testing the various locks illustrated has indicated that the locks will hold under all conditions making the hooks safe. This invention will substantially reduce accidents to recreational fishermen and their children who enjoy this sport and end-up in a hospital with a hook in their body.

Another object of the invention is to provide an easily adjustable fishing rod holder means made of non-corrosive materials that will afford the similar benefits afforded by expensive outrigger equipment that most people cannot afford on their small boats. This invention will be very economical and it can be placed on the stern of a boat where it will work as an outrigger, or on the coaming where it would be adjustable in a fore and aft direction.

Another object of the invention is to provide a multiple unit construction of more than one fishing pole holder on the same base that will allow more than one fisherman to use one device that rotates to so many positions. It is economical and practical & useful & new.

These and other objects of the invention will be apparent from the following specifications and drawings, of which:

FIG. 1 is a front view of the fishing pole holder,

FIG. 2 is a side view of the holder of FIG. 1,

FIG. 3 is a partial exploded side view of the holder,

FIG. 4 is a perspective view of the base with means for temporarily securing the base to a support, FIGS. 5, 6 and 7 show front fragmentary views of fish hook securing means on the fishing pole holder, FIG. 8 is a partial front view of FIG. 1, showing additional means for securing the pole to the holder FIG. 9 is a front plan view of a unit with more than one holder.

FIG. 1 shows a base plate with mounting holes 2 to receive means for securing the device to a support. The plate has an arcuate cutout slot formed therethrough, a pivot hole 4 above the slot 3 to receive a bolt 21 for pivotally mounting a fishing rod holding tube 9 to the plate, and arcuate degree markings 5 on the face of the plate below the slot 3. The tube 9 has an open upper end 6 and the base thereof, which may also be open, has a pointer 14 which is positioned to move along the markings 5. The means to lock the tube in a selected pivotal position includes a threaded bolt 17 which passes through slot 3 and the wall of tube 9 above the base thereof to be engaged by a locking nut 16 and a frictional seal 18 on the outer side of the tube 9. A fishing pole 19 has its butt end positioned in the holding tube 9 resting on bolt 17. The pole is locked in the holder by a lock bolt 7, shown in FIG. 2, which passes through a hole in the tube wall. Bolt 7 has a head on one end and a U-shaped clamp 12 on the end inside the tube to engage and grip the fishing pole. A spring 13 is disposed on the shank of bolt 7 between the bolt head and clamp 12.

Disposed on the outer surface of tube 9 adjacent the open upper end 6 is an annular band 8 having cutouts formed along its lower edge and apertures to provide securing means for fish hooks 22 of various sizes when the pole is not in use. FIG. 5 shows one form of band as it is mounted on tube 9, and FIG. 6 discloses a modified form. FIG. 7 shows a further modification which employs the same band 8 as shown in FIG. 5 with the additional illustration of a neoprene or rubber insert 8A to band 8, which insert is secured to tube 9 by rivet 8B.

In FIG. 2, a fishing pole 19 is shown mounted in tube 9 and includes the usual reel and line guides 20. An additional fish hook securing means 24 may be provided on the pole 19 opposite to one of the line guides 20.

FIG. 4 discloses means for removably securing plate 1 to a support, such as a boat gunwale, including a threaded bolt 11 and an angled bar 11'. Bar 11' is secured at one end to plate 1 and at the other end to a plate through which bolt 11 is threaded to engage the support and thus clamp plate 1 thereto.

The operational features of the fishing rod holder vary with the installation when installed upon the stern or side coaming of a boat. Should a clamping means such as means 11 in FIG. 4 be desirable, then the fishing rod holder can be removed and stored after use. The placement of the fishing rod holder device on the stern coaming of a boat will allow off-side use on both sides similar to an outrigger. The placement on the side coaming will allow fore and aft vertical movement including the storing of a pole in a substantially horizontal position.

After installing the device, a fishing pole 19 is placed in the tube 9 after releasing the lock bolt 7 attached to the U shaped clamp 12 held in by spring 13. After the pole 19 is placed in the tube 9 the fishing hooks 22 are then attached to the band 8 for securing against accidents. The movement of the tube 9 is made by loosening the threaded lock bolt nut 16, thereby releasing the pressure of the lock nut 16 against the tube 9 by the seal 18. The tube is then set at a desired angle on scale 5 of the base by the pointer 14 on the tube 9. The locking bolt nut 16 is then turned until tight.

The fishing pole can also be secured to the holder by an attached chain 23 extending from the tube 9 to the fishing pole 19 as shown in FIG. 8.

The fishing pole holder in a modified form shown in FIG. 9 has more than one pole holding tube 9 on a single base 1 that is secured by additional screws. In this modification a multiple number of pole holders may be placed upon one single base part 1 to allow for many outward positions of the poles while fishing or in storage. When in use the attachable chain securing means 23 shown in FIG. 8 attached to the rod 19 and the tube 9 will strengthen the holding power of a fishing rod.

The means of securing the rod against theft includes the use of a lock on the fishing pole locking bolt 7 operated by a key 26 shown in FIG. 3.

The materials used in constructing the device must necessarily withstand water hazards, corrosion and other problems around the water. It is to be understood that the form of the invention herewith shown and described is to be taken as a preferred example of the same, and that various changes in the shape, size and arrangement of parts may be resorted to, without departing from the spirit of the invention or the scope of the subjoined claims.

I claim:

1. An adjustable fishing rod holder comprising a base plate having means for mounting the plate to a support, an arcuate slot convexly curved downwardly formed through said plate and an arcuate scale disposed on said plate below said slot, a holding tube for a fishing rod pivotally mounted to said plate above said slot with the pivot point equidistantly spaced from the ends of said slot, a pointer on the bottom of the holding tube and disposed to move along the arcuate scale, a threaded bolt extending through the lower end of the holding tube and slot and serving as a support for the said fishing rod, a hand adjustable tightening nut on the bolt and a friction seal on the bolt between the nut and the holding tube, whereby when the nut is loosened the lower end of the tube can be moved along the length of the slot to tilt the tube and then locked in a desired position by tightening the nut, a second bolt extending through the holding tube above the plate and having a spring-biased U-shaped clamp thereon to engage and lock the fishing rod in the tube, a chain secured at one end to the holding tube and at the other end to the fishing rod, and fish hook securing means secured to the upper end of the tube comprising a circular band with slots along the lower edge thereof and apertures above the said slots.

2. Apparatus as in claim 1, wherein fishing hook securing means is adaptable for various size hooks.

3. Apparatus as in claim 1, wherein the adjustable fishing rod holder can store a fishing pole in a substantially horizontal position.

4. Apparatus as in claim 1, wherein a pair of fishing rod tubes are mounted on the base to allow for use of two or more poles simultaneously.

5. Apparatus as in claim 1, wherein the locking nut frictional seal is formed of a neoprene material providing the holding means for the various positions of the fishing rod tube relative to the base member.

6. Apparatus as in claim 1, wherein the base plate is reduced in thickness in the area of the arcuate slot to receive the head of the threaded bolt.

* * * * *